US 12,547,593 B2

(12) United States Patent
Wu

(10) Patent No.: US 12,547,593 B2
(45) Date of Patent: Feb. 10, 2026

(54) METHOD AND APPARATUS FOR SHARING FAVORITE

(71) Applicant: Apollo Intelligent Connectivity (Beijing) Technology Co., Ltd., Beijing (CN)

(72) Inventor: Junfa Wu, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 192 days.

(21) Appl. No.: 17/752,657

(22) Filed: May 24, 2022

(65) Prior Publication Data

US 2022/0283991 A1    Sep. 8, 2022

(30) Foreign Application Priority Data

Jun. 2, 2021    (CN) .......................... 202110615191.2

(51) Int. Cl.
*G06F 16/176* (2019.01)
*G06F 16/16* (2019.01)
*G06K 19/06* (2006.01)

(52) U.S. Cl.
CPC .......... *G06F 16/176* (2019.01); *G06F 16/16* (2019.01); *G06K 19/06037* (2013.01)

(58) Field of Classification Search
CPC ...... G06F 16/176; G06F 16/16; G06F 16/909; G06F 16/9554; G06F 21/6218;
(Continued)

(56) References Cited

U.S. PATENT DOCUMENTS 9,298,935 B1 *    3/2016   Kumar .................... H04L 63/00
2007/0073697 A1 *  3/2007   Woods ................ G06F 16/9566
                                                           707/E17.115
(Continued)

FOREIGN PATENT DOCUMENTS

CN        103678555 A      3/2014
CN        104391974 A      3/2015
(Continued)

OTHER PUBLICATIONS

Korean Office Action dated Jan. 25, 2025 in related Korean Application No. 10-2022-0046180; twelve pages.

*Primary Examiner* — Ann J Lo
*Assistant Examiner* — Fernando M Mari Valcarcel
(74) *Attorney, Agent, or Firm* — Kilpatrick Townsend & Stockton LLP

(57) ABSTRACT

A method and an apparatus for sharing a favorites folder, and relates to the field of computer technology, in particular to the field of information sharing technology. An implementation of the method includes: first, in response to obtaining a sharing condition, determining a favorites folder area corresponding to the sharing condition, where the favorites folder area includes a public domain favorites area; and then if it is determined that the favorites folder area corresponding to the sharing condition is the public domain favorites area, obtaining a favorites information to be shared corresponding to a current location from the public domain favorites area and sharing the favorites information to be shared, which realizes the automatic sharing of the favorites information.

19 Claims, 5 Drawing Sheets

(58) Field of Classification Search
CPC ............... G06F 16/9562; G06F 16/958; G06F 16/9566; G06K 19/06037
See application file for complete search history.

(56) References Cited

U.S. PATENT DOCUMENTS

| | | | | |
|---|---|---|---|---|
| 2011/0054776 | A1* | 3/2011 | Petrov | G01C 21/3694 |
| | | | | 715/764 |
| 2011/0173235 | A1* | 7/2011 | Aman | G06V 40/23 |
| | | | | 707/E17.055 |
| 2013/0151590 | A1* | 6/2013 | Feng | H04W 4/80 |
| | | | | 709/203 |
| 2014/0365432 | A1 | 12/2014 | Jain et al. | |
| 2016/0085769 | A1* | 3/2016 | Penangwala | G06F 16/178 |
| | | | | 707/610 |
| 2017/0139891 | A1* | 5/2017 | Ah-Soon | G06F 40/18 |
| 2017/0255619 | A1* | 9/2017 | Raichelgauz | H04L 63/105 |
| 2018/0032997 | A1 | 2/2018 | Gordon et al. | |
| 2018/0191732 | A1 | 7/2018 | Erciyes et al. | |
| 2019/0230152 | A1* | 7/2019 | Wang | G06F 16/188 |
| 2019/0354395 | A1* | 11/2019 | Clark | G06F 7/00 |
| 2020/0359167 | A1* | 11/2020 | Noeth | H04M 1/72457 |

FOREIGN PATENT DOCUMENTS

| | | |
|---|---|---|
| CN | 107135498 A | 9/2017 |
| JP | 2011-253480 A | 12/2011 |
| KR | 10-2015-0083589 A | 7/2015 |
| WO | 2016/105778 A1 | 6/2016 |
| WO | 2020/207083 A1 | 10/2020 |

\* cited by examiner

METHOD AND APPARATUS FOR SHARING FAVORITE

CROSS-REFERENCE TO RELATED APPLICATIONS

This application claims priority to Chinese Patent Application No. 202110615191.2, filed with the China National Intellectual Property Administration (CNIPA) on Jun. 2, 2021, the content of which is incorporated herein by reference in its entirety.

TECHNICAL FIELD

Embodiments of the present disclosure relate to the field of computer technology, particularly to the field of information sharing technology, and in particular to a method and device for sharing favorites folder.

BACKGROUND

With the continuous development of Internet technology, as an important part of daily life, vehicle and mobile navigation maps carry people's daily travel needs. Maps, as one of the information carriers, carry the humanities and history of the region. The favorites folder reflects personal preferences or even a class of user's preferences.

The current map favorites folder can only be viewed by the user who created them, cannot support the function of sharing according to classifications thereof, cannot classify the created favorites folders, and favorites folders cannot be shared to other users.

SUMMARY

The present disclosure provides a method for sharing favorites folder, device, electronic device, and storage medium.

According to an aspect of the present disclosure, a method for sharing a favorites folder is provided. The method includes: in response to obtaining a sharing condition, determining a favorites folder area corresponding to the sharing condition, where the favorites folder area includes a public domain favorites area; and in response to determining that the favorites folder area corresponding to the sharing condition is the public domain favorites area, obtaining, from the public domain favorites area, favorites information to be shared corresponding to a current location and sharing the favorites information to be shared.

According to another aspect of the present disclosure, an apparatus for sharing a favorites folder is provided. The apparatus incudes: a determining module, configured to, in response to obtaining a sharing condition, determine a favorites folder area corresponding to the sharing condition, where the favorites folder area includes a public domain favorites area; and a sharing module, configured to, in response to determining that the favorites folder area corresponding to the sharing condition is the public domain favorites area, obtain favorites information to be shared corresponding to a current location from the public domain favorites area and share the favorites information to be shared.

According to another aspect of the present disclosure, some embodiments of the present disclosure provide an electronic device. The electronic device includes: at least one processor; and a memory, in communication connection with the at least one processor; where the memory storing instructions executable by the at least one processor, the instructions, when executed by the at least one processor, cause the at least one processor to implement the method for sharing a favorites folder according to the first aspect.

According to another aspect of the present disclosure, some embodiments of the present application provide a computer-readable medium having computer instructions stored thereon, and the computer instructions are used to enable a computer to execute the above method for sharing favorite.

According to another aspect of the present disclosure, an embodiment of the present application provides a computer program product, which includes a computer program, and the computer program implements the above method for sharing favorite when executed by a processor.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the solution, and do not constitute a limitation to the scope of the present disclosure. Where.

DETAILED DESCRIPTION

Exemplary embodiments of the present disclosure will be described below with reference to the accompanying drawings, which include various details of embodiments of the present disclosure to facilitate understanding, and should be regarded as merely exemplary. Therefore, those of ordinary skill in the art should understand that various changes and modifications can be made to the embodiments described herein without departing from the scope and spirit of the present disclosure. Likewise, for clarity and conciseness, descriptions of well-known functions and structures are omitted in the following description.

It should be noted that embodiments in the present disclosure and the features in the embodiments can be combined with each other on non-conflict basis. Hereinafter, Embodiments of the present disclosure will be described in detail with reference to the drawings.

Figure 1:
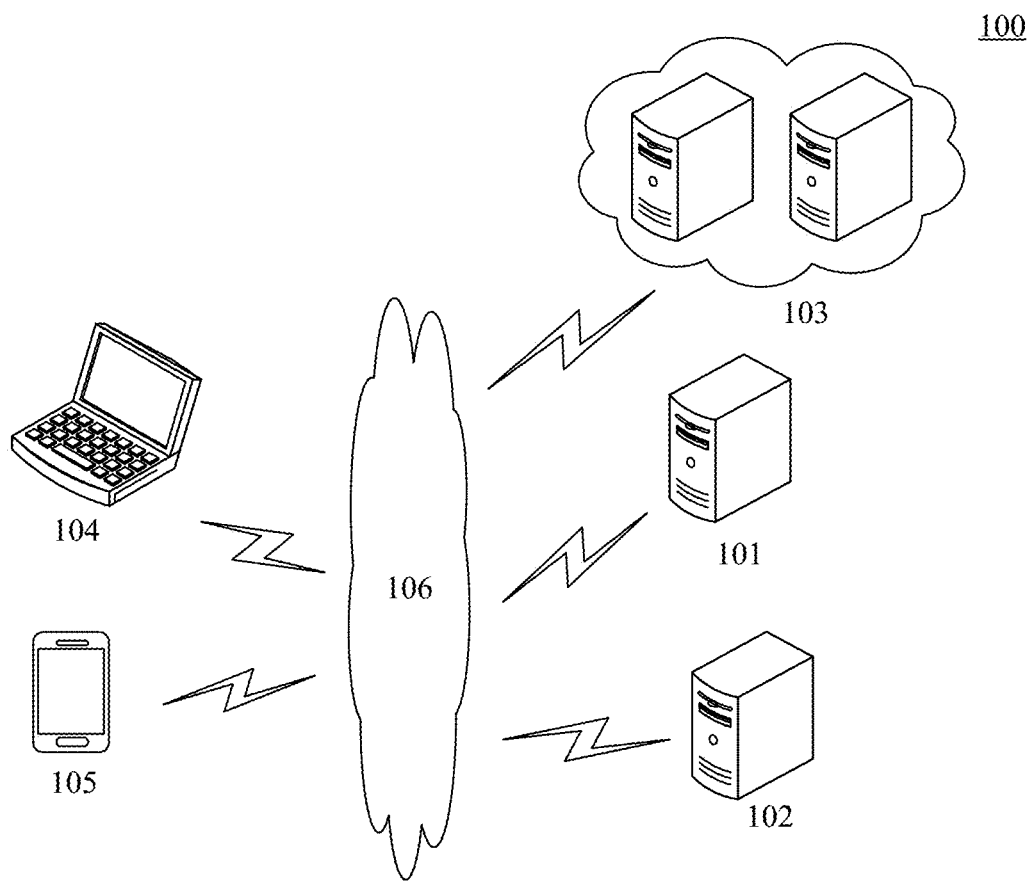
FIG. 1 is an exemplary system architecture diagram to which embodiments of the present disclosure my be applied.

FIG. 1 shows an exemplary system architecture 100 to which a method for sharing a favorites folder according to an embodiment of the present disclosure may be applied.

As shown in FIG. 1, the system architecture 100 may include terminal device(s) 104, 105, a network 106, server(s) 101, 102, and a cloud server 103. The network 106 is used to provide a medium for communication links between the terminal device(s) 104, 105, the server(s) 101, 102, and the cloud server 103. The network 106 may include various connection types, such as wired, wireless communication links, fiber-optic cables, or the like.

The terminal device(s) 104, 105 may interact with the server(s) 101, 102 and the cloud server 103 via the network 106 to receive or send information and the like. Various applications may be installed on the terminal device(s) 104, 105, such as search applications, data collection applications, data processing applications, instant messaging tools, social platform software, shopping applications, and the like.

The servers 101, 102 and the cloud server 103 may be servers that provide various services, for example, a back-end server that receives requests sent by terminal devices with which a communication connection is established. The background server may receive and analyze the request sent by the terminal device, and generate the processing result.

The cloud server 103 may detect the terminal device(s) 104, 105 in real-time to judge whether the sharing condition for sharing favorites information is met. The sharing conditions may include an automatic trigger condition for automatically sharing the favorites information, which may be a change of the current environment of the mobile terminal, for example, a change of the location. The automatic trigger condition may correspond to a public domain favorites area that includes favorites information which may be displayed publicly. The sharing conditions may also include a passive trigger condition for passive sharing of favorites information, which may be that a user initiatively inputs an acquisition information for favorites information, for example, a user inputs a verification code for a favorites folder. The passive trigger condition may correspond to a private domain favorites area that includes favorites information that the display thereof is hidden. After obtains the sharing condition, the cloud server 103 analyzes the sharing condition and determines the favorites folder area corresponding to the sharing condition according to the sharing condition. The cloud server 103 may include a plurality of favorites folder areas, and each favorites folder area may include a plurality of favorites information stored by different users. The favorites folder area may include the public domain favorites area and the private domain favorites area. If the sharing condition is an automatic trigger condition, it may be determined that the favorites folder area corresponding to the sharing condition is the public domain favorites area. If the sharing condition is a passive trigger condition, it may be determined that the favorites folder area corresponding to the sharing condition is the private domain favorites area. If the cloud server 103 determines that the favorites folder area is a public domain favorites area based on the sharing condition, it further determines the current location of the user holding the terminal device, and obtains favorites information to be shared corresponding to the current location from the public domain favorites area according to the current location, and then the cloud server 103 shares the determined favorites information to be shared. The cloud server 103 may deliver the determined favorites information to be shared to the terminal device of the user at the current location, so that the user can receive and view the favorites information to be shared.

It should be noted that the server can be hardware or software. When the server is hardware, it can be various electronic devices that provide various services for terminal devices. When the server is software, it can be implemented as multiple software or software modules that provide various services for the terminal device, or can be implemented as a single software or software module that provides various services for the terminal device, which is not limited herein.

It should be noted that the method for sharing favorites folder provided by the embodiment of the present disclosure may be executed by the cloud server 103. Correspondingly, the device for sharing favorites folder may be provided in the cloud server 103.

It should be understood that the numbers of terminal devices, networks, servers and cloud servers in FIG. 1 are merely illustrative. According to implementation needs, there can be any number of terminal devices, networks, servers, and cloud servers.

Figure 2:
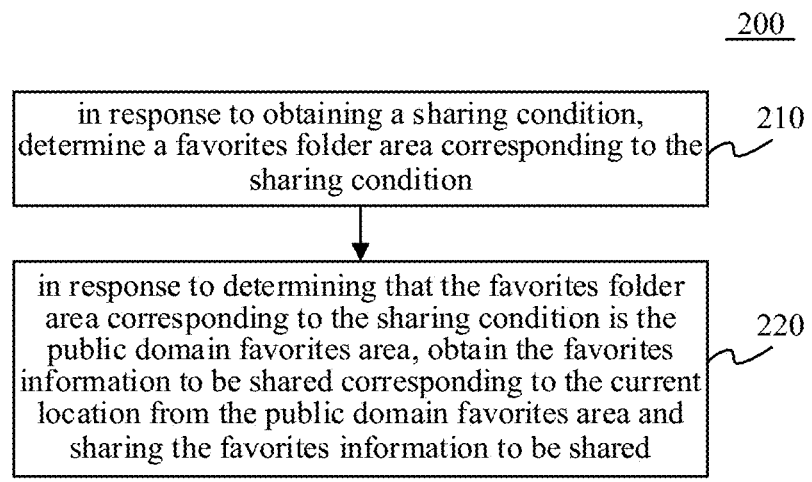
FIG. 2 is a flowchart of a method for sharing a favorites folder according to an embodiment of the present disclosure.

Referring to FIG. 2, FIG. 2 shows a schematic flowchart 200 of the method for sharing favorites folder according to an embodiment of the present disclosure. The method for sharing favorites folder includes the following steps:

Step 210: in response to obtaining a sharing condition, determining a favorites folder area corresponding to the sharing condition.

In this embodiment, the execution body (for example, the cloud server 103 in FIG. 1) of the method for sharing favorites folder may perform real-time detection on a terminal to judge whether the terminal meets the sharing condition for sharing favorites information. The sharing conditions may be of different attribute types, including automatic trigger condition for automatically sharing favorites information, which may be a change of the current parameters of the terminal. As an example, the favorites information may be a map favorites folder, and the sharing condition may be a change of the terminal's location or other condition that may cause the current parameters of the terminal to change. The sharing conditions may also include a passive trigger condition for passive sharing of favorites information, which may be that a user initiatively inputs acquisition information for the favorites information. As an example, favorites information may be a map favorites folder, and the sharing condition may be a condition where that a user views the map favorites folder through a terminal may be served as an acquisition information for the favorites information.

The above execution body obtains that the terminal meets the sharing condition after performing the detection on the terminal, and then performs type analysis on the sharing condition to determine the favorites folder area corresponding to the sharing condition. The above execution body may store a plurality of favorites folder areas locally, and different sharing conditions correspond to different favorites folder areas. Each favorites folder area may be created according to the creation instruction of a terminal. The plurality of favorites folder areas may be set with different display attributes. The above favorites folder areas may include a public domain favorites area. The public domain favorites area may be a public domain that is established on the basis of user disclosure, and allows different users to add, extract, and view favorites information through the network. Here, each user may freely process the favorites information in the public domain favorites area, and the automatic trigger condition included in the above sharing conditions may correspond to the public domain favorites area. Therefore, if it is determined that the acquired sharing condition is an automatic trigger condition, the favorites information in the local public domain favorites area is determined as to be shared.

Step 220: in response to determining that the favorites folder area corresponding to the sharing condition is the public domain favorites area, obtaining the favorites information to be shared corresponding to the current location from the public domain favorites area and sharing the favorites information to be shared.

In this embodiment, after obtains the sharing condition, the above execution body may analyze the sharing condition to judge whether the sharing condition is an automatic trigger condition, and if it is determined that the sharing condition is an automatic trigger condition, then determine that the favorites folder area corresponding to the sharing condition is the public domain favorites area.

The above execution body may obtain the current location of the terminal, and according to the current location, determine the favorites information corresponding to the current location in the public domain favorites area as the favorites information to be shared. The favorites information to be shared may be a plurality of favorites information associated with the current location. The above execution body sends the favorites information to be shared to the terminal, and the terminal may display a plurality of favorites information in the favorites information to be shared in a preset area through a pop-up window or the like, and the user may select among the plurality of favorites information displayed on the terminal, so as to click to view the favorites information.

As an example, the above favorites information is a map favorites folder, and the above execution body obtains the current location of the user who uses the map application, and then determines a plurality of map favorites folders associated with the current location of the user from the favorites information included in the public domain favorites area, and sends the plurality of map favorites folders to the map application on the terminal, and the terminal displays the associated plurality of map favorites folders in the form of pop-up windows in the map application for the user to select.

Figure 3:
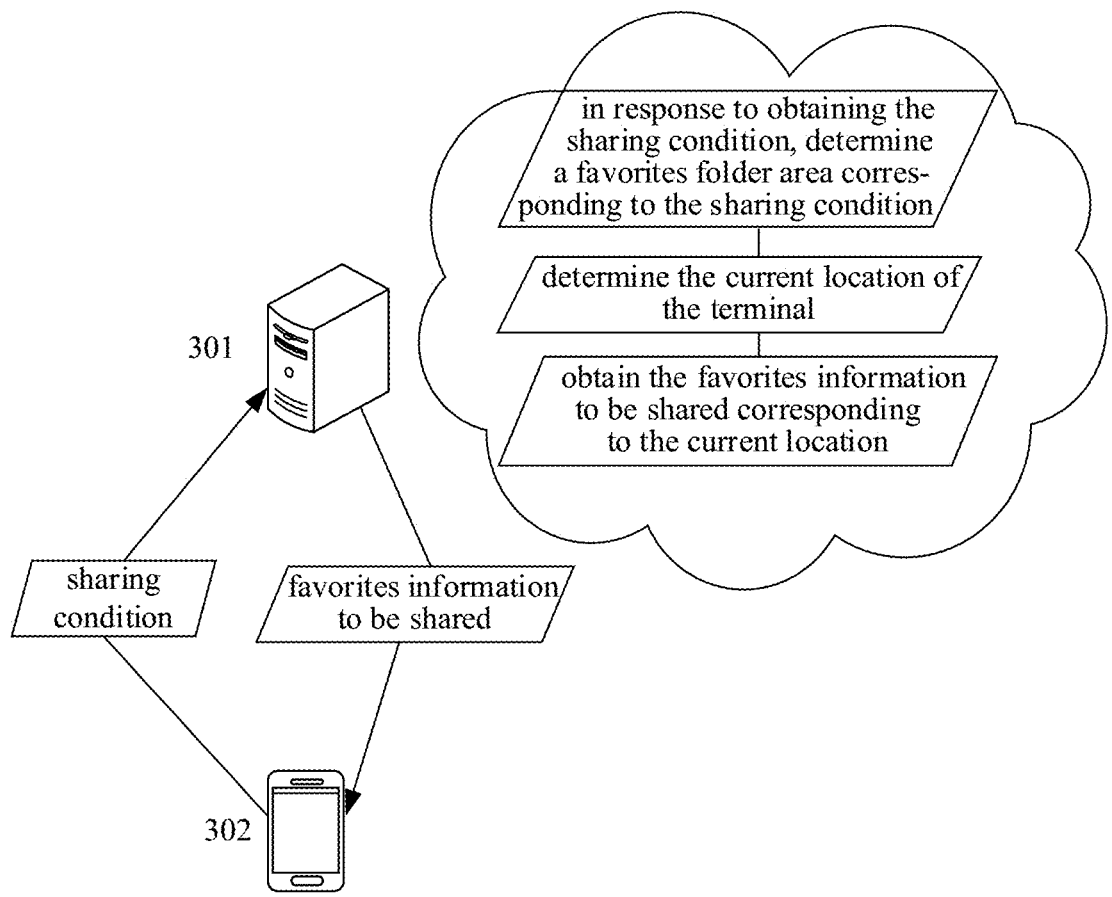
FIG. 3 is a schematic diagram of an application scenario of the method for sharing a favorites folder according to an embodiment of the present disclosure.

Continuing to refer to FIG. 3. FIG. 3 is a schematic diagram of an application scenario of the method for sharing a favorites folder according to this embodiment. In the application scenario of FIG. 3, the cloud server 301 may perform detection on the terminal 302 in real-time to judge whether the sharing condition for sharing the favorites information is satisfied. After obtains the sharing condition, the cloud server 301 analyzes the sharing condition and determines the favorites folder area corresponding to the sharing condition according to the sharing condition. Here, the cloud server 301 may include a plurality of favorites folder areas, each favorites folder area may include a plurality of favorites information stored by different users, and the favorites folder areas may include a public domain favorites area. If the cloud server 301 determines that the favorites folder area is a public domain favorites area based on the sharing condition, the cloud server 301 further determines the current location of the terminal 302, obtains the favorites information to be shared corresponding to the current location from the public domain favorites area according to the current location of the terminal 302, and then shares the determined favorites information to be shared. The cloud server 301 may deliver the determined favorites information to be shared to the terminal 302 so that the user may receive and view the favorites information to be shared through the terminal 302.

The method for sharing favorites folder provided by the embodiment of the present disclosure determines the favorites folder area corresponding to the sharing condition in response to acquisition of the sharing condition, here, the favorites folder area includes the public domain favorites area. Then if the favorites folder area corresponding to the sharing condition is determined as a public domain favorites area, the favorites information to be shared corresponding to the current location is obtained from the public domain favorites area and then shared. Thus the automatic sharing of the favorites information is realized, and favorites information is no longer only available for a user to view by himself or herself, which renders the favorites information being passed between users and being shared with other users, like business cards, improving the shareability and flexibility of the favorites information. At the same time, it is possible to get the information that other users are interested in through the shared favorites information, and to expand the user's personal interests.

Figure 4:
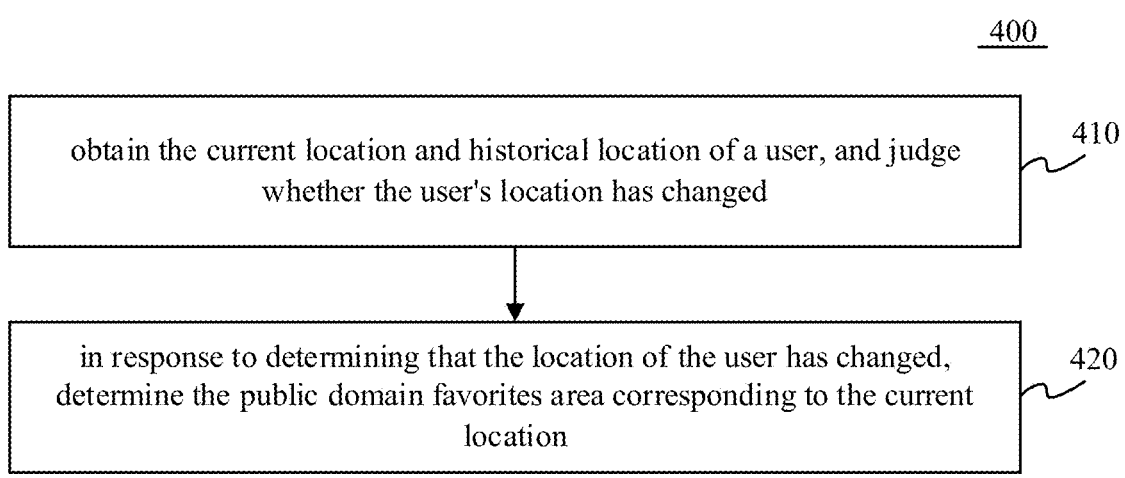
FIG. 4 is a flowchart of determining a favorites folder area according to an embodiment of the present disclosure.

As an optional implementation, the above sharing condition may include a change in location. With further reference to FIG. 4, in above step 210, in response to obtaining the sharing condition, determining a favorites folder area corresponding to the sharing condition may include the following steps:

Step 410: obtaining the current location and historical location of a user, and judging whether the user's location has changed.

In this step, the above execution body detects the location of the terminal, and obtains the current location and the historical location of the user who uses the terminal. The current location may be a location collected by performing GPS positioning on the terminal at the current moment, and the historical location may be a location collected by performing GPS positioning on the terminal before a preset time period.

Optionally, the above execution body may perform GPS positioning on the terminal every preset time period, use the GPS positioning information at the current moment as the current location, and use the GPS positioning information collected last time as the historical location.

Optionally, the above execution body may perform real-time positioning on the terminal, use the GPS positioning information at the current moment as the current location, and use the GPS positioning information at a preset time period before the current moment as the historical location.

After acquiring the current location and historical location of the user, the above execution body compares the current location and the historical location to determine whether the current location and the historical location are consistent, so as to judge whether the user's location has changed. That is, if it is determined that the current location is consistent with the historical location, it is determined that the user's location has not changed; if it is determined that the current location and the historical location are inconsistent, it is determined that the user's location has changed.

Step 420: in response to determining that the location of the user has changed, determining the public domain favorites area corresponding to the current location.

In this step, the above execution body determines that the user's location has changed after judging based on the current location and the historical location, and then it may be determined that the change in the location of the terminal causes the current parameters of the terminal to change, which belongs to a sharing condition that is an automatic trigger condition. Then the above execution body may determine that it is the favorites information in the public domain favorites area needs to be shared, and determine the public domain favorites area corresponding to the current location.

As an example, the above execution body may determine that the terminal enters the current area from another area based on the current location and historical location, and determine that the user's location has changed, and then automatically determine that the favorites information in the public domain favorites area needs to be shared.

In this implementation, by determining the public domain favorites area based on a change in location, automatic sharing of favorites information can be realized without the user's active acquisition, saving user operations, and improving the shareability and sharing efficiency of favorites information.

As an optional implementation, in above step 220, in response to determining that the favorites folder area corresponding to the sharing condition is a public domain favorites area, obtaining the favorites information to be shared corresponding to the current location from the public domain favorites area, and sharing the favorites information to be shared may include the following steps:

Step 1: determining the favorites information to be shared from the public domain favorites area according to the current location.

Particularly, after determines that the favorites folder area corresponding to the sharing condition is the public domain favorites area, according to the current location, the above execution body determines the favorites information corresponding to the current location in the public domain favorites area as the favorites information to be shared. The favorites information to be shared may be a plurality of favorites information associated with the current location.

Step 2: generating a quick response (QR) code corresponding to the favorites information to be shared and sharing the generated QR code, for the user to scan the QR code to obtain the favorites information to be shared.

Particularly, after obtains the favorites information to be shared, the above execution body may use the QR code encoding technology to encode each favorites information in the favorites information to be shared to generate the QR code corresponding to each favorites information. The above execution body sends the QR code corresponding to each favorites information to the terminal. The terminal may display the QR code corresponding to each favorites information in a preset area through pop-up windows or the like. The user may select among the QR codes corresponding to the respective favorites information displayed on the terminal, and scan the selected QR code to view the corresponding favorites information.

In this implementation, by sharing the QR code generated from the favorites information to be shared, the data volume of information transmission is reduced, and the efficiency and safety of information sharing are improved.

Figure 5:
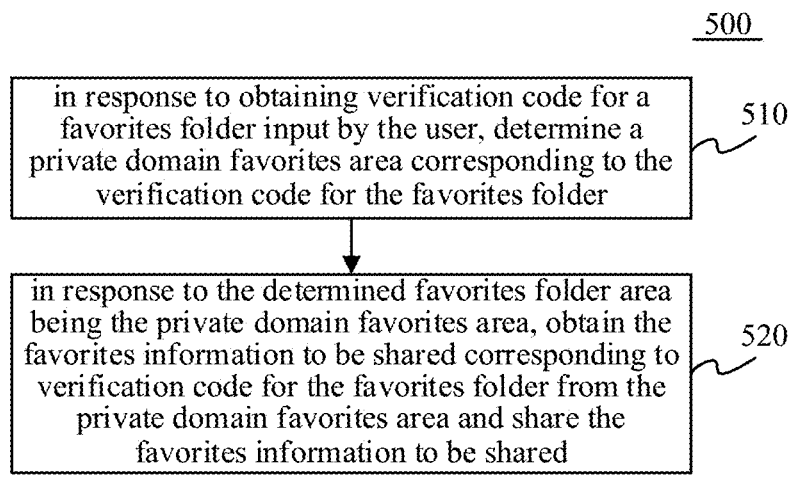
FIG. 5 is a flowchart of a method for sharing a favorites folder according to another embodiment of the present disclosure.

With further reference to FIG. 5, the above favorites folder area may include a private domain favorites area in addition to the public domain favorites area; and, the above sharing condition may also include obtaining a verification code for a favorites folder. The verification code for the favorites folder may be the verification information set by the user when creating the private domain favorites area and used to view the favorites information in the private domain favorites area. The verification code for a favorites folder may include the password for viewing the private domain favorites area and the classification code corresponding to each favorites information in the private domain favorites area. FIG. 5 shows another embodiment of the method for sharing favorites folder, which may include the following steps:

Step 510: in response to obtaining verification code for a favorites folder input by the user, determine a private domain favorites area corresponding to the verification code for the favorites folder.

In this step, the above execution body may perform detection on the terminal in real-time, obtain verification code for a favorites folder sent by the terminal and input by the user, and determine that the user actively acquires the favorites information through the terminal. The verification code for the favorites folder corresponds to the private domain favorites area one-to-one. The above favorites folder area may also include a private domain favorites area. The private domain favorites area may be established on the basis of the user's independence, and the user may add, extract, and view favorites information therein through the network. In the private domain favorites area, the user who obtains the verification code for the favorites folder may process the favorites information in the private domain favorites area. Here, the above sharing condition may include obtaining the verification code for a favorites folder, which is a passive trigger condition included in the sharing condition. The passive trigger condition may correspond to the private domain favorites area. Therefore, if the above execution body obtains a verification code for a favorites folder, it may be determined that the acquired sharing condition is a passive trigger condition, the favorites information that needs to be shared is in the private domain favorites area, and the local favorites information in the private domain favorites area is determined to be shared.

Step 520: in response to the determined favorites folder area being the private domain favorites area, obtaining the favorites information to be shared corresponding to verification code for the favorites folder from the private domain favorites area and sharing the favorites information to be shared.

In this step, after the above execution body determines that the favorites folder area is a private domain favorites area, the above execution body may analyze the verification code for the favorites folder to determine the password in the verification code, so that judge whether to open the private domain favorites area based on the password. If the password is correct, open the private domain favorites area. The above execution body may also determine a classification code in the favorite verification code, search for the favorites information in the private domain favorites area according to the classification code, determine the favorites information to be shared corresponding to the classification code, and send the favorites information to be shared to the terminal. The terminal may display the favorites information to be shared in a preset area through a pop-up window or the like, and the user may select among the favorites information to be shared displayed on the terminal, so as to click to view the favorites information.

Alternatively, the above execution body judges the password in the favorite verification code and determines that the password is incorrect, then does not open the private domain favorites area, and sends a prompt message indicating that the password is incorrect to the terminal.

In this embodiment, the user actively enters the verification code for a favorites folder to obtain the favorites information to be shared, which improves the security and diversity of information sharing. At the same time, the user may actively acquire the favorites information to understand the information that other users are interested in, which can expand users' personal interests.

As an optional implementation, the above favorites folder area may be obtained on the basis of the following steps:

(1) In response to receiving a classification creation instruction sent by the terminal, creating a favorites folder area including a public domain favorites area and a private domain favorites area.

Particularly, the user may submit a classification creation request for the favorites folder area through the terminal, and the terminal sends the classification creation request submitted by the user to the above execution body. The above execution body may receive the classification creation instruction sent by the terminal, and locally create two favorites folder areas, i.e. the public domain favorites area and the private domain favorites area, based on the classification creation instruction.

Here, the public domain favorites area may be used to store user favorites information that is capable of being be publicly displayed and obtained, and the favorites information stored in the public domain favorites area may be automatically sent to a terminal according to the sharing conditions such as a change in the location of the terminal. The public domain favorites area may also enable users to extract favorites information based on personal location.

Here, the private domain favorites area may be used to store user favorites information that can be viewed and obtained through a password, and the favorites information stored in the private domain favorites area may be sent to the terminal according to sharing conditions such as the password and/or classification code sent by the terminal.

(2) In response to receiving the adding instruction sent by the terminal, add user favorites information into the public domain favorites area and the private domain favorites area respectively.

Particularly, after the above execution body separately creates two favorites folder areas, i.e., the public domain favorites area and the private domain favorites area, locally according to the classification creation instruction, the above execution body may also receive an adding instruction sent by the terminal. The above execution body analyzes the received adding instruction, determines the favorites folder area corresponding to the adding instruction, and adds the favorites information that the user needs to add into the favorites folder area corresponding to the adding instruction.

Here, the above execution body analyzes the adding instruction, determines that the favorites folder area corresponding to the adding instruction is the public domain favorites area, and stores the favorites information added by the user into the public domain favorites area.

Here, the above execution body analyzes the adding instruction, determines that the favorites folder area corresponding to the adding instruction is the private domain favorites area, and obtains verification code for a favorites folder sent by the user through the terminal, and determines whether the password in the verification code is correct. If it is correct, the execution body determines the classification code of the favorites information added by the user, and associatively stores the favorites information and the classification code into the private domain favorites area.

In this implementation, the terminal sends classification creation instruction and adding instruction to create the favorites folder area and adds favorites information into the favorites folder area, which may allow users to customize their own exclusive favorites folder according to their needs, and may also allow users to customize their own collections to enrich the favorites information and increase the diversity of favorites information.

As an optional implementation, the above favorites folder area may also be obtained on the basis of the following steps:

(3) In response to receiving the style customization instruction sent by the terminal, binding a favorites style corresponding to the style customization instruction to the current favorites information of the user.

Particularly, the user may set the favorites style of the favorites information through the terminal, and set the favorites style according to a preset rule. The preset rule may correspond to the type of favorites information or the location of the favorites information, which is not limited herein. For example, favorites information corresponding to different locations corresponds to different favorites styles, and different types of favorites information correspond to different favorites styles, and the like. The terminal receives the user's request for setting the favorites style of the favorites information, determines the preset rule selected by the user for setting the favorites style, determines the corresponding favorites style according to the selected preset rule, and then renders the favorites information according to the determined favorites style to get the rendered favorites information.

As an example, the above favorites information includes a basketball court, and the user selects the preset rule to be a preset rule set according to the type of favorites information, and then the terminal determines that the favorites style of the above favorites information is a basketball style according to the selected preset rule. The terminal renders the favorites information according to the basketball style, and obtains the favorites information rendered with the basketball pattern.

After determining the favorites style of the favorites information according to the preset rule selected by the user, the terminal may also send a style customization instruction to the above execution body, and send the determined favorites style to the above execution body. After receiving the style customization instruction and the corresponding favorites style sent by the terminal, the above execution body determines the favorites information corresponding to the style customization instruction in the local favorites folder area, and binds the determined favorites information with the corresponding favorites style.

In this implementation, the favorites style and the favorites information are bound through the style customization instruction, so that the style of the favorites information is more in line with user needs, allowing users to customize their own exclusive favorites folders according to their needs, enriching the favorites information, and improving the diversity of favorites information.

As an optional implementation, the above method for sharing favorite may further include the following steps: in response to receiving an extraction instruction sent by the terminal, acquiring current location, and extracting favorites information from the public domain favorites area according to the current location.

Particularly, the above execution body may receive the extraction instruction sent by the terminal and acquire the current location of the user. Here, the extraction instruction is a favorites information acquisition request submitted by the user through the terminal. The above execution body obtains a plurality of favorites information associated with the current location in the public domain favorites area according to the current location. The above execution body sends the determined plurality of pieces of favorites information to the terminal. The terminal may display the plurality of pieces of favorites information in a preset area through pop-up windows or the like, and the user may select among the plurality of pieces of favorites information displayed on the terminal, so as to click to view favorites information.

In this implementation, the favorites information in the public domain favorites area is extracted through the extraction instruction, so that the user is capable of obtaining the favorites information associated with the current location, and understanding the information that other users around are interested in, and expand personal interests.

Figure 6:
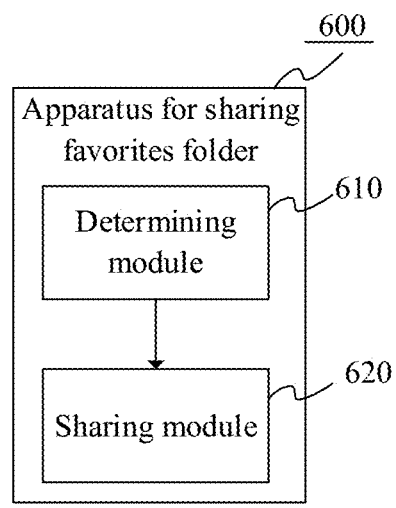
FIG. 6 is a flowchart of an apparatus for sharing favorite according to an embodiment of the present disclosure.

With further reference to FIG. 6, as an implementation of the methods shown in the above figures, an embodiment of the present disclosure provides an apparatus for sharing favorites folder. The apparatus embodiment corresponds to the method embodiment shown in FIG. 2, and this apparatus may be applied to various electronic devices.

As shown in FIG. 6, the apparatus 600 for sharing favorites folder of this embodiment includes: a determining module 610 and a sharing module 620.

Here, the determining module 610 is configured to, in response to obtaining a sharing condition, determine a favorites folder area corresponding to the sharing condition, here the favorites folder area includes a public domain favorites area;

The sharing module 620 is configured to, in response to determining that the favorites folder area corresponding to the sharing condition is the public domain favorites area, obtain favorites information to be shared corresponding to a current location from the public domain favorites area and share the favorites information to be shared.

In some optional implementations of this embodiment, the sharing condition includes a change in location. the determining module includes: a judging unit, configured to obtain the current location and historical location of a user, and judge whether the location of the user has changed; and a first determining unit, which is configured to determine the public domain favorites area corresponding to the current location in response to determining the location of the user has changed.

In some optional implementations of this embodiment, the sharing module includes: a second determining unit, configured to determine the favorites information to be shared from the public domain favorites area according to the current location; and a sharing unit, configured to generate a quick response (QR) code information corresponding to the favorites information to be shared and share the generated QR code, for the user to scan the QR code to obtain the favorites information to be shared.

In some optional implementations of this embodiment, the favorites folder area also includes a private domain favorites area; the sharing condition includes obtaining a verification code for a favorites folder; and the determining module is further configured to, in response to obtaining the verification code for the favorites folder input by a user, determining the private domain favorites area corresponding to the verification code for the favorites folder; and the sharing module is further configured to, in response to a determined favorites folder area is the private domain favorites area, obtain favorites information to be shared corresponding to the verification code for the favorites folder from the private domain favorites area and share the favorites information to be shared.

In some optional implementations of this embodiment, the favorites folder area is acquired based on the following steps: in response to receiving a classification creation instruction sent by a terminal, creating a favorites folder area including the public domain favorites area and a private domain favorites area; and in response to receiving an adding instruction sent by the terminal, add favorites information of a user into the public domain favorites area and the private domain favorites area respectively.

In some optional implementations of this embodiment, the apparatus further includes: a binding module, configured to, in response to receiving a style customization instruction sent by the terminal, bind a favorites style corresponding to the style customization instruction with the favorites information of the user, where the favorites style is set and rendered according to a preset rule.

The apparatus for sharing favorites folder provided by the embodiment of the present disclosure determines the favorites folder area corresponding to the sharing condition in response to the acquisition of the sharing condition, and the favorites folder area includes a public domain favorites area. Then, if it is determined that the favorites folder area corresponding to the sharing condition is a public domain favorites area, the favorites information to be shared corresponding to the current location is obtained from the public domain favorites area and shared, thus the automatic sharing of the favorites information is realized, and the favorites information is no longer only available for users to view by themselves, so that the favorites information can be passed between users and shared with other users, like business cards. The shareability and flexibility of the favorites information is improved, and at the same time, the shared favorites information can be obtained to understand the information that other users are interested in, which can expand the user's personal interest.

In the technical solution of the present disclosure, the acquisition, storage, and application of the user's personal information involved are in compliance with relevant laws and regulations, and does not violate public order and good customs.

According to an embodiment of the present disclosure, provides an electronic device, a readable storage medium, and a computer program product are provided.

Figure 7:
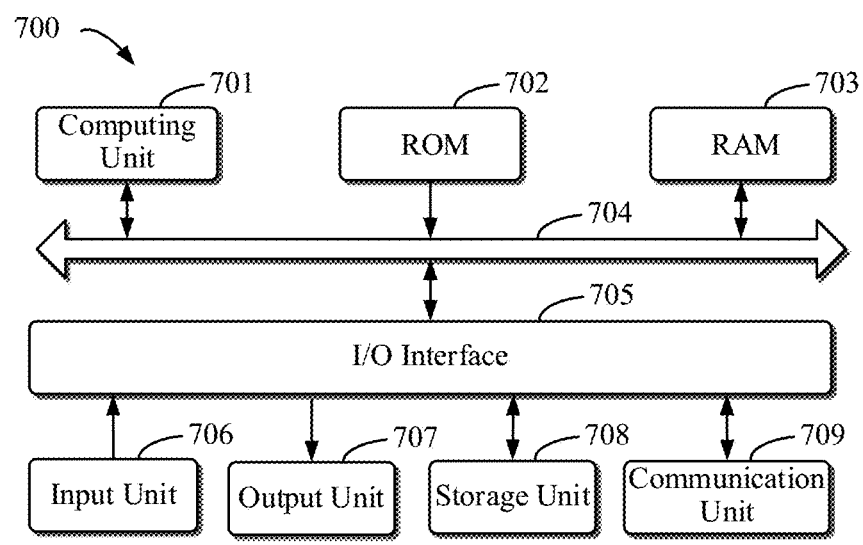
FIG. 7 is a block diagram of an electronic device used to implement the method for sharing a favorites folder according to an embodiment of the present disclosure.

FIG. 7 is a schematic block diagram of an exemplary electronic device 700 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 7, the electronic device 700 includes a computing unit 701, which can perform various appropriate actions and processing according to a computer program stored in a read-only memory (ROM) 702 or a computer program loaded from a storage unit 708 into a random access memory (RAM) 703. In the RAM 703, various programs and data required for the operation of the device 700 can also be stored. The computing unit 701, the ROM 702, and the RAM 703 are connected to each other through a bus 704. An input/output (I/O) interface 705 is also connected to the bus 704.

Multiple components in the electronic device 700 are connected to the I/O interface 705, including: an input unit 706, such as a keyboard, a mouse, and the like; an output unit 707, such as various types of displays, speakers, and the like; and a storage unit 708, such as a magnetic disk, an optical disk, and the like; and a communication unit 709, such as a network card, a modem, a wireless communication transceiver, and the like. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of computing unit 701 include, but are not limited to, central processing unit (CPU), graphics processing unit (GPU), various dedicated artificial intelligence (AI) computing chips, various computing units that run machine learning model algorithms, digital signal processing (DSP), and any appropriate processor, controller, microcontroller, or the like. The computing unit 701 executes the various methods and processes described above, such as the method for sharing favorites folder. For example, in some embodiments, the method for sharing favorites folder may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the method for sharing favorites folder described above can be executed. Alternatively, in other embodiments, the computing unit 701 may be configured to execute the method for sharing favorites folder through any other suitable means (for example, by means of firmware).

The various implementations of the systems and technologies described herein can be implemented in digital electronic circuit systems, integrated circuit systems, field programmable gate arrays (FPGA), application-specific integrated circuits (ASIC), application-specific standard products (ASSP), system-on-chip SOC, load programmable logic device (CPLD), computer hardware, firmware, software, and/or their combination. These various embodiments may include: being implemented in one or more computer programs, the one or more computer programs may be executed and/or interpreted on a programmable system including at least one programmable processor, the programmable processor can be a dedicated or general-purpose programmable processor that can receive data and instructions from the storage system, at least one input device, and at least one output device, and transmit the data and instructions to the storage system, the at least one input device, and the at least one output device.

The program code used to implement the method of the present disclosure can be written in any combination of one or more programming languages. These program codes can be provided to the processors or controllers of general-purpose computers, special-purpose computers, or other programmable data processing devices, so that when the program codes are executed by the processors or controllers, the functions/operations specified in the flowcharts and/or block diagrams are implemented. The program code can be executed entirely on a machine or partly executed on the machine, partly executed on the machine and partly executed on a remote machine as an independent software package, or entirely executed on a remote machine or server.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media may include electrical connections based on one or more wires, portable computer disks, hard drives, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In order to provide interaction with a user, the systems and technologies described herein may be implemented on a computer, the computer has: a display apparatus (e.g., CRT (cathode ray tube) or LCD (liquid crystal display) monitor for displaying information to the user; and a keyboard and a pointing apparatus (for example, a mouse or trackball), the user may use the keyboard and the pointing apparatus to provide input to the computer. Other kinds of apparatuses may also be used to provide interaction with the user; for example, the feedback provided to the user may be any form of sensory feedback (for example, visual feedback, auditory feedback, or tactile feedback); and may use any form (including acoustic input, voice input, or tactile input) to receive input from the user.

The systems and technologies described herein may be implemented in a computing system (e.g., as a data server) that includes back-end components, or a computing system (e.g., an application server) that includes middleware components, or a computing system (for example, a user computer with a graphical user interface or a web browser, through which the user may interact with the embodiments of the systems and technologies described herein) that includes front-end components, or a computing system that includes any combination of such back-end components, middleware components, or front-end components. The components of the system may be interconnected by any form or medium of digital data communication (e.g., a communication network). Examples of the communication network include: local area network (LAN), wide area network (WAN), Internet, and blockchain network.

The computer system may include a client and a server. The client and the server are generally far from each other and usually interact through a communication network. The client and server relationship is generated by computer programs operating on the corresponding computer and having client-server relationship with each other. The server may be a cloud server, a distributed system server, or a server combined with a blockchain.

It should be understood that various forms of processes shown above may be used to reorder, add, or delete steps. For example, the steps described in the present disclosure may be performed in parallel, sequentially, or in different orders, as long as the desired results of the technical solution disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this disclosure shall be included in the protection scope of this disclosure.

What is claimed is:

1. A method for sharing a favorites folder, comprising:
receiving, from a first terminal, an adding instruction corresponding to a private domain favorites area, obtaining a password from the first terminal, and determining that the password is correct, obtaining a map favorites folder and a classification code set through the first terminal, and associatively storing the map favorites folder and the classification code into the private domain favorites area;
obtaining a sharing condition from a second terminal, determining in favorites folder areas a favorites folder area corresponding to the sharing condition, where the favorites folder areas include a public domain favorites area and private domain favorites areas;
determining that the favorites folder area corresponding to the sharing condition is the public domain favorites area, obtaining, from the public domain favorites area, a plurality of map favorites folders to be shared corresponding to a current location, sending the plurality of map favorites folders to the second terminal and displaying the plurality of map favorites folders in form of pop-up windows in a map application of the second terminal, and in response to a click on a pop-up window in the pop-up windows, displaying on the second terminal the map favorites folder corresponding to the clicked pop-up window; and
determining that the sharing condition comprises obtaining the password and the classification code for a favorites folder from the second terminal, wherein the password is used for viewing the private domain favorites area and the classification code is corresponding to the map favorites folder in the private domain favorites area, performing operations comprising:
determining, in the private domain favorites areas, the private domain favorites area corresponding to the password;
determining that the password is correct, and accessing the private domain favorites area corresponding to the password;
searching according to the classification code, in the private domain favorites area corresponding to the password, for the map favorites folder corresponding to the classification code; and
sending the map favorites folder corresponding to the classification code to the second terminal, so that the second terminal displays the map favorites folder as a pop-up window in the map application.

2. The method of claim 1,
wherein, the sharing condition includes a change in a location; and
obtaining the sharing condition, wherein determining the favorites folder area corresponding to the sharing condition comprises:
obtaining a current location and a historical location of a user, and judging whether the location of the user has changed; and
determining the public domain favorites area corresponding to the current location based on the judging.

3. The method of claim 2, wherein,
determining that the favorites folder area corresponding to the sharing condition is the public domain favorites area, and obtaining, from the public domain favorites area, a map favorites folder to be shared corresponding to a current location and sharing the map favorites folder to be shared, comprises:
determining the map favorites folder to be shared from the public domain favorites area according to the current location; and
generating a quick response (QR) code corresponding to the map favorites folder to be shared and sharing the generated QR code, for the user to scan the QR code to obtain the map favorites folder to be shared.

4. The method of claim 1, wherein the method is performed by a cloud server, and the public domain favorites area and the private domain favorites areas are created locally in the cloud server.

5. The method of claim 1, wherein, the favorites folder area is acquired based on the following steps:
receiving a classification creation instruction sent by the first terminal, and creating the public domain favorites area and the private domain favorites areas.

6. The method of claim 5, wherein, the method further comprises:
receiving a style customization instruction sent by the first terminal, and binding a favorites style corresponding to the style customization instruction with the map favorites folder, where the favorites style is set and rendered according to a preset rule.

7. The method of claim 1, wherein the method further comprises:
wherein the map favorites folder comprises a basketball style, rendering the map favorites folder according to the basketball style.

8. An apparatus for sharing a favorites folder, comprising:
at least one processor; and
a memory storing instructions, the instructions when executed by the at least one processor, cause the at least one processor to perform operations, the operations comprising:
receiving, from a first terminal, an adding instruction corresponding to a private domain favorites area, obtaining a password from the first terminal, and determining that the password is correct, obtaining a map favorites folder and a classification code set through the first terminal, and associatively storing the map favorites folder and the classification code into the private domain favorites area;
obtaining a sharing condition from a second terminal, determining in favorites folder areas a favorites folder area corresponding to the sharing condition, where the favorites folder areas include a public domain favorites area and private domain favorites areas;
determining that the favorites folder area corresponding to the sharing condition is the public domain favorites area, obtaining, from the public domain favorites area, a plurality of map favorites folders to be shared corresponding to a current location, sending the plurality of map favorites folders to the second terminal and displaying the plurality of map favorites folders in form of pop-up windows in a map application of the second terminal, and in response to a click on a pop-up window in the pop-up windows, displaying on the second terminal the map favorites folder corresponding to the clicked pop-up window; and determining that the sharing condition comprises obtaining the password and the classification code for a favorites folder from the second terminal, wherein the password is used for viewing the private domain favorites area and the classification code is corresponding to the map favorites folder in the private domain favorites area, performing operations comprising:

determining, in the private domain favorites areas, the private domain favorites area corresponding to the password;

determining that the password is correct, and accessing the private domain favorites area corresponding to the password;

searching according to the classification code, in the private domain favorites area corresponding to the password, for the map favorites folder corresponding to the classification code; and sending the map favorites folder corresponding to the classification code to the second terminal, so that the second terminal displays the map favorites folder as a pop-up window in the map application.

9. The apparatus of claim 8, wherein, the sharing condition comprises a change in a location; and obtaining the sharing condition, wherein determining the favorites folder area corresponding to the sharing condition comprises:

obtaining the current location and a historical location of a user, and judging whether the location of the user has changed; and determining the public domain favorites area corresponding to the current location based on the judging.

10. The apparatus of claim 9, wherein, determining that the favorites folder area corresponding to the sharing condition is the public domain favorites area, wherein obtaining, from the public domain favorites area, a map favorites folder to be shared corresponding to a current location and sharing the map favorites folder to be shared, comprises:

determining the map favorites folder to be shared from the public domain favorites area according to the current location; and generating a quick response (QR) code information corresponding to the map favorites folder to be shared and sharing the generated QR code, for the user to scan the QR code to obtain the map favorites folder to be shared.

11. The apparatus of claim 8, wherein the apparatus is applied in a cloud server, and the public domain favorites area and the private domain favorites areas are created locally in the cloud server.

12. The apparatus of claim 8, wherein, the favorites folder area is acquired based on the following steps:

receiving a classification creation instruction sent by the first terminal, and creating the public domain favorites area and the private domain favorites areas.

13. The apparatus of claim 12, wherein, the operations further comprise:

receiving a style customization instruction sent by the first terminal, and binding a favorites style corresponding to the style customization instruction with the map favorites folder of the user, where the favorites style is set and rendered according to a preset rule.

14. A non-transitory computer readable storage medium, storing computer instructions thereon, the computer instructions are used to enable a computer to execute operations, the operations comprising:

receiving, from a first terminal, an adding instruction corresponding to a private domain favorites area, obtaining a password from the first terminal, and determining that the password is correct, obtaining a map favorites folder and a classification code set through the first terminal, and associatively storing the map favorites folder and the classification code into the private domain favorites area;

obtaining a sharing condition from a second terminal, determining in favorites folder areas a favorites folder area corresponding to the sharing condition, where the favorites folder areas include a public domain favorites area and private domain favorites areas;

determining that the favorites folder area corresponding to the sharing condition is the public domain favorites area, obtaining, from the public domain favorites area, a plurality of map favorites folders to be shared corresponding to a current location, sending the plurality of map favorites folders to the second terminal and displaying the plurality of map favorites folders in form of pop-up windows in a map application of the second terminal, and in response to a click on a pop-up window in the pop-up windows, displaying on the second terminal the map favorites folder corresponding to the clicked pop-up window; and determining that the sharing condition comprises obtaining the password and the classification code for a favorites folder from the second terminal, wherein the password is used for viewing the private domain favorites area and the classification code is corresponding to the map favorites folder in the private domain favorites area, performing operations comprising:

determining, in the private domain favorites areas, the private domain favorites area corresponding to the password;

determining that the password is correct, and accessing the private domain favorites area corresponding to the password;

searching according to the classification code, in the private domain favorites area corresponding to the password, for map favorites folder corresponding to the classification code; and sending the map favorites folder corresponding to the classification code to the second terminal, so that the second terminal displays the map favorites folder as a pop-up window in the map application.

15. The medium of claim 14, wherein the sharing condition includes a change in a location; and obtaining the sharing condition, wherein determining the favorites folder area corresponding to the sharing condition comprises:

obtaining a current location and a historical location of a user, and judging whether the location of the user has changed; and in response to determining that the location of the user has changed, determining the public domain favorites area corresponding to the current location.

16. The medium of claim 15, wherein, determining that the favorites folder area corresponding to the sharing condition is the public domain favorites area, and obtaining, from the public domain favorites area, a map favorites folder to be shared corresponding to a current location and sharing the map favorites folder to be shared, comprises: determining the map favorites folder to be shared from the public domain favorites area according to the current location; and generating a quick response (QR) code corresponding to the map favorites folder to be shared and sharing the generated QR code, for the user to scan the QR code to obtain the map favorites folder to be shared.

17. The medium of claim 14, wherein the operations are performed by a cloud server, and the public domain favorites area and the private domain favorites areas are created locally in the cloud server.

18. The medium of claim 14, wherein, the favorites folder area is acquired based on the following steps:
receiving a classification creation instruction sent by the first terminal, and creating the public domain favorites area and the private domain favorites areas.

19. The medium of claim 18, wherein the operations further comprise:
receiving a style customization instruction sent by the first terminal, and binding a favorites style corresponding to the style customization instruction with the map favorites folder of the user, where the favorites style is set and rendered according to a preset rule.

* * * * *